US010705769B2

(12) United States Patent
Ozawa

(10) Patent No.: US 10,705,769 B2
(45) Date of Patent: Jul. 7, 2020

(54) PRINT SYSTEM WITH A PRINTER DRIVER STORING PERSONAL PANEL SETTING INFORMATION AND NON-TRANSITORY RECORDING MEDIUM STORING A COMPUTER READABLE PROGRAM

(71) Applicant: Konica Minolta, Inc., Chiyoda-ku, Tokyo (JP)

(72) Inventor: Tomohiro Ozawa, Tama (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/989,251

(22) Filed: May 25, 2018

(65) Prior Publication Data
US 2018/0349068 A1 Dec. 6, 2018

(30) Foreign Application Priority Data
Jun. 6, 2017 (JP) .................. 2017-111925

(51) Int. Cl.
G06F 3/12 (2006.01)
H04N 1/00 (2006.01)

(52) U.S. Cl.
CPC .......... G06F 3/1204 (2013.01); G06F 3/1222 (2013.01); G06F 3/1238 (2013.01);
(Continued)

(58) Field of Classification Search
CPC .... G06F 3/1225; G06F 3/1276; G06F 3/1277; G06F 3/1208; G06F 3/1238; G06F 3/1253; G06F 3/1254
See application file for complete search history.

(56) References Cited

U.S. PATENT DOCUMENTS 8,527,886 B2 * 9/2013 Morikawa ............. G06F 3/1238
358/1.15
2007/0198845 A1 * 8/2007 Morikawa ............. G06F 3/1238
713/182

(Continued)

FOREIGN PATENT DOCUMENTS

JP 2003-208596 A 7/2003
WO 2015182861 A2 12/2015

OTHER PUBLICATIONS

First Office Action issued in corresponding Chinese Patent Application No. 201810538434.5 dated Dec. 19, 2019 (16 pages).

Primary Examiner — Juan M Guillermety
(74) Attorney, Agent, or Firm — Buchanan Ingersoll & Rooney

(57) ABSTRACT

Disclosed is a print system, including a printer driver; and a print device, wherein the printer driver obtains personal panel setting information of a user having the printer driver and stores the personal panel setting information, and prepares a print job including identification information of the user and stored personal panel setting information and transmits the print job to the print device; and the print device comprises: a job memory which stores the print job received from the printer driver; and a hardware processor which allows a printing in accordance with the print job in case that an authenticated user is coincident with the user who is indicated in the identification information, and which displays an operation window customized in accordance with the personal panel setting information in case that the authenticated user is coincident with the user who is indicated in the identification information.

19 Claims, 13 Drawing Sheets

(52) U.S. Cl.
CPC .......... *G06F 3/1267* (2013.01); *G06F 3/1285* (2013.01); *H04N 1/00411* (2013.01); *H04N 1/00514* (2013.01); *G06F 3/1205* (2013.01); *G06F 3/1257* (2013.01); *H04N 2201/0094* (2013.01)

(56) References Cited

U.S. PATENT DOCUMENTS

| | | | |
|---|---|---|---|
| 2008/0175615 A1* | 7/2008 | Kodimer | G03G 15/5091 399/81 |
| 2008/0222181 A1* | 9/2008 | Yoshioka | G06F 3/1238 |
| 2009/0231353 A1* | 9/2009 | Han | G03G 15/502 358/1.15 |
| 2010/0309513 A1* | 12/2010 | Aizawa | G06F 3/1273 358/1.15 |
| 2013/0246509 A1* | 9/2013 | Sakiyama | G06F 3/1253 709/203 |
| 2015/0163291 A1* | 6/2015 | Fukasaka | H04L 67/10 709/201 |
| 2015/0193674 A1* | 7/2015 | Ishiguro | G06F 3/1205 358/1.15 |
| 2017/0192724 A1* | 7/2017 | Kim | G06F 3/1276 |

* cited by examiner

PRINT SYSTEM WITH A PRINTER DRIVER STORING PERSONAL PANEL SETTING INFORMATION AND NON-TRANSITORY RECORDING MEDIUM STORING A COMPUTER READABLE PROGRAM

The entire disclosure of Japanese Patent Application No. 2017-111925 filed on Jun. 6, 2017, is incorporated herein by reference in its entirety.

BACKGROUND

Technological Field

The present invention relates to a print system and a non-transitory recording medium storing a computer readable program which can carry out the printing by executing the user authentication at the print device.

Description of the Related Art

In recent years, as a print method for avoiding the risk in which the printed document is seen by another person at a print device or is taken away by another person, and for improving the security for the printed document, a so-called security print has been proposed. In the security print, the print job in which the user who is allowed to output the document is designated is transmitted from a PC (Personal Computer) to a print device. Then, the print device which receives the above print job does not immediately start the printing and stores the print job. When the allowed user logs in the print device by executing the user authentication, the printing is or can be carried out in accordance with the stored print job.

Further, a print system which can handle a so-called ubiquitous print in which any print device connected via the network can print the document by carrying out the security print via the print server, has been popularized. For example, the ubiquitous print is carried out as follows. The PC transmits the print job in which the user who is allowed to output the document is designated to the print server, and the print server which receives the print job stores the above print job. When the allowed user logs in any one of the print devices by executing the user authentication, the print device which the user logs in inquires of the print server whether the print server stores the print jobs in which the log-in user is the allowed user, and displays the list of the print jobs which can be executed. Then, the print device obtains the print job which is selected in view of the list, from the print server, and executes the obtained print job.

Like the security print or the ubiquitous print, in the print system for carrying out the printing by executing the user authentication, it is considered that the setting window of the printer is displayed by customizing the window for each user.

In Japanese Patent Application Publication No. 2003-208596, the following system is displayed. In the system, by exchanging the programs for creating the window and the setting information between the multi function peripherals via the network or via the server, the same user interface (I/F) is realized at all of the multi function peripherals.

In case that each print device stores the programs and the information for customizing the setting windows of the printer and the like for each user, the storage of each print device is increased and the burden on each print device becomes large.

On the other hand, as disclosed in Japanese Patent Application Publication No. 2003-208596, in case that the information for displaying the operation windows and the like is exchanged via the server, when the server is down, the function for customizing the operation windows cannot be used. It is necessary for each user to operate the print device via the operation window which is different from the regular operation window customized for the user. As a result, the user-friendliness for the print device is decreased.

SUMMARY

One of the objects of the present invention is to provide a print system and a non-transitory recording medium storing a computer readable program which can display the operation window customized for each user on the print device without increasing the burden on the print device even if the server is down.

To achieve at least one of the abovementioned objects, according to an aspect of the present invention, a print system reflecting one aspect of the present invention, comprises:

a printer driver; and
a print device,
wherein the printer driver obtains personal panel setting information of a user having the printer driver and stores the personal panel setting information in a storing memory, and prepares a print job including identification information of the user and the stored personal panel setting information and transmits the print job to the print device; and
the print device comprises:
a first job memory which stores the print job received from the printer driver; and
a first hardware processor which allows a printing in accordance with the print job in case that an authenticated user is coincident with the user who is indicated in the identification information included in the print job, and which displays an operation window which is customized in accordance with the personal panel setting information included in the print job in case that the authenticated user is coincident with the user who is indicated in the identification information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, one or more embodiments of the present invention will be described with reference to the drawings. However, the scope of the invention is not limited to the disclosed embodiments.

First Embodiment

Figure 1:
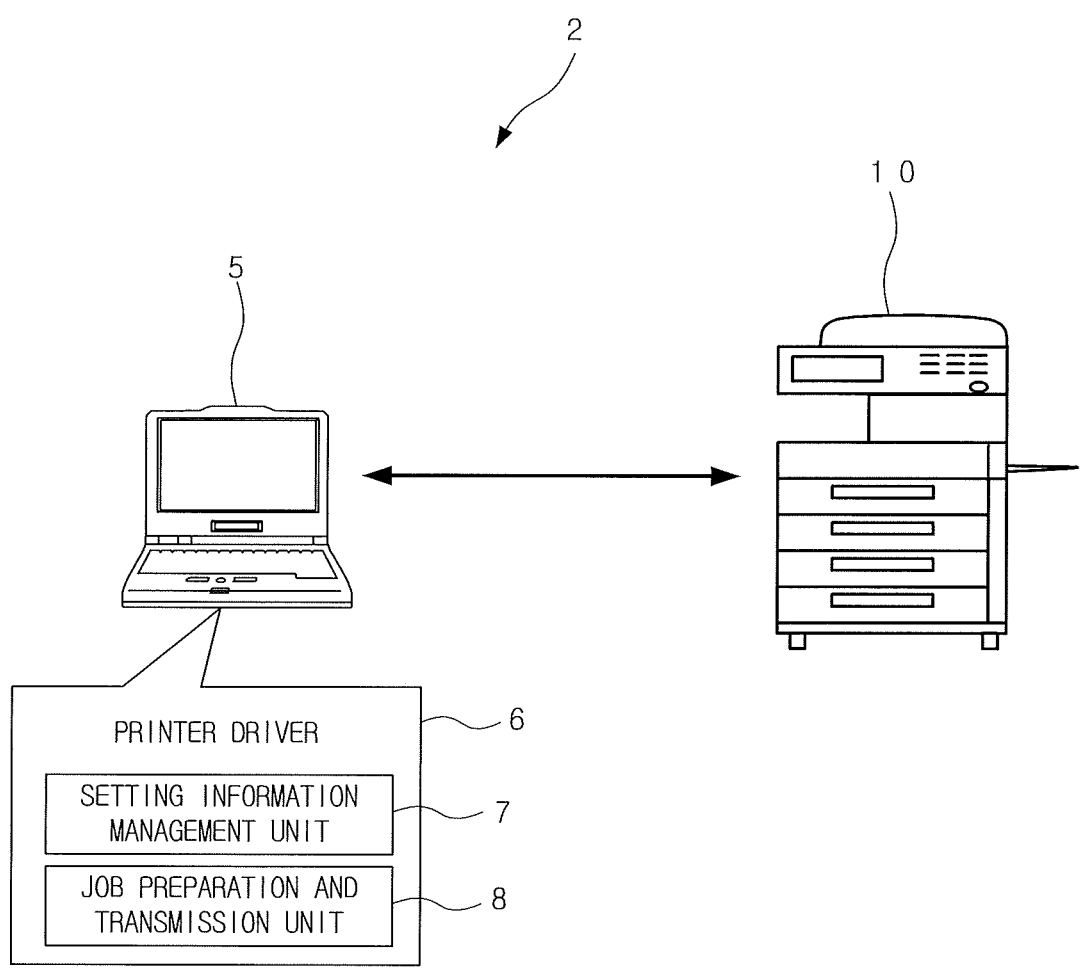
FIG. 1 is a view showing an example of the configuration of the print system according to the first embodiment.

FIG. 1 is a view showing an example of the configuration of the print system 2 according to the first embodiment. In the print system 2, the information processing device (hereinafter, referred to as "PC 5"), such as a personal computer, which is used by a user, and a multi function peripheral 10 as the print device are connected with each other via a network, such as LAN (Local Area Network) or the like.

The PC 5 comprises a CPU (Central Processing Unit), a ROM (Read Only Memory), a RAM (Random Access Memory) and the like. The PC 5 operates in accordance with various types of programs, such as the application programs and the like. In the PC 5, the printer driver 6 which is the program having the function for preparing the print job to be transmitted to the multi function peripheral 10 and transmitting the prepared print job, is installed. The PC 5 has the function for authenticating the user.

The multi function peripheral 10 is the image forming apparatus having the function for executing various types of jobs, such as a copy job for printing an image on the recording sheet in accordance with the image data obtained by optically reading an original with a scanner, a storing job for storing the image data of the read original as a file or the like, a transmission job for transmitting the image data of the read original as a file or the like to an external device, a print job for printing out an image on the recording sheet in accordance with the data of the print job received from the PC 5, a facsimile job for transmitting and receiving the image data in accordance with the facsimile protocol, and the like. Hereinafter, the multi function peripheral 10 is also referred to as MFP. Instead of the multi function peripheral 10, a print device which executes only the print job may be used.

In the multi function peripheral 10, it is possible to customize the operation window to be displayed on the operation panel, for each user. Further, the multi function peripheral 10 has the function for authenticating the user. When the user succeeds in the user authentication and, logs in the multi function peripheral 10, the operation window which is customized for the log-in user in accordance with the personal panel setting information of the log-in user can be displayed.

Figure 2:
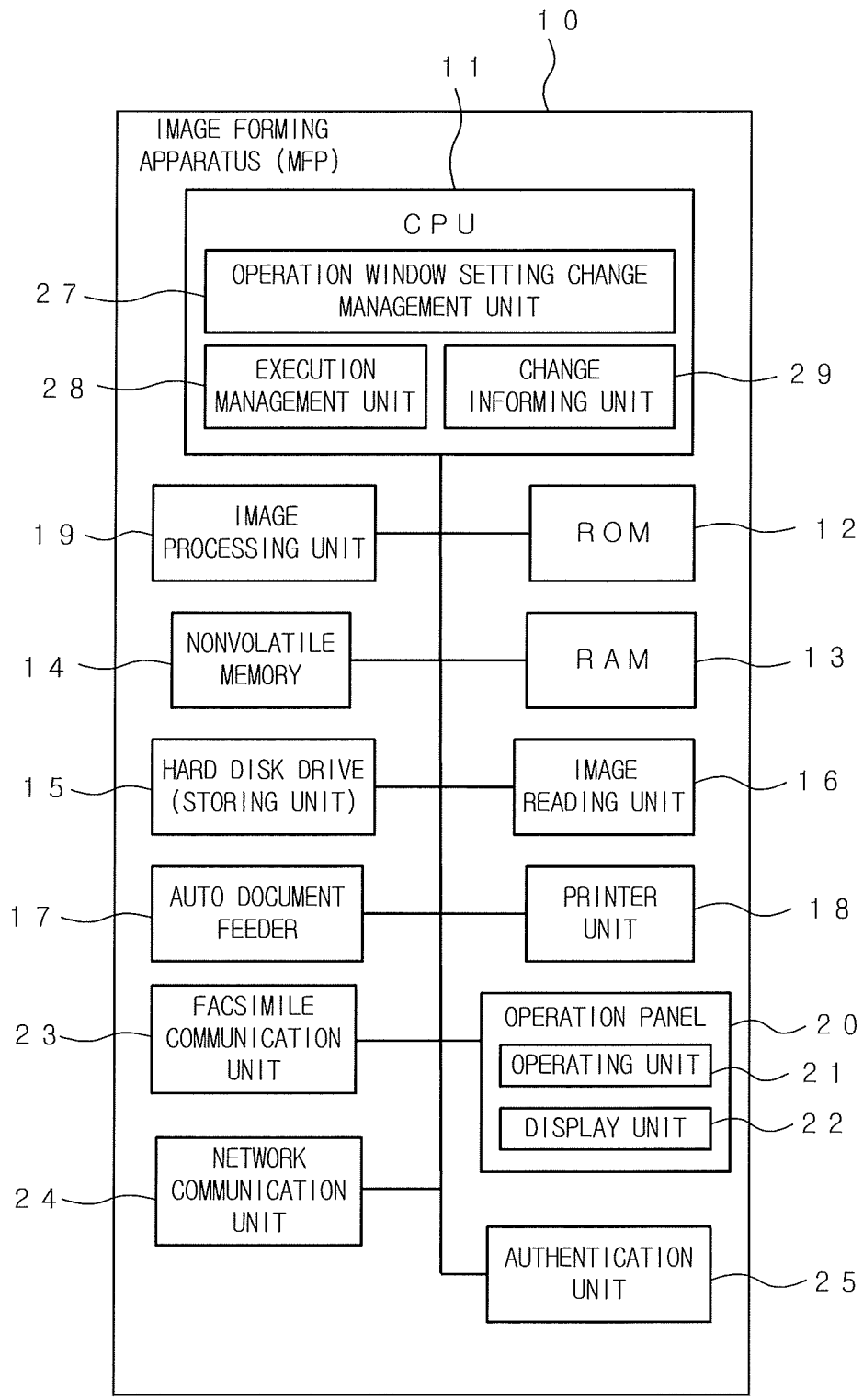
FIG. 2 is a block diagram showing the schematic configuration of the multi function peripheral.

FIG. 2 is a block diagram showing the schematic configuration of the multi function peripheral 10. The multi function peripheral 10 comprises a CPU 11 for entirely controlling the operation of the multi function peripheral 10. The CPU 11 is connected with a ROM 12, a RAM 13, a nonvolatile memory 14, a hard disk drive 15, an image reading unit 16, an auto document feeder (ADF) 17, a printer unit 18, an image processing unit 19, an operation panel 20, a facsimile communication unit 23, a network communication unit 24, an authentication unit 25 and the like. The operation unit 20 comprises an operating unit 21 and a display unit 22.

By the CPU 11, a middleware, application programs and the like are executed on an OS (Operating System) program as a base. In the ROM 12, various types of programs are stored. By executing various types of processes by the CPU 11 in accordance with these programs, each function of the multi function peripheral 10 is realized.

The RAM 13 is used as a work memory for temporarily storing various data when the CPU 11 executes the process in accordance with the programs, an image memory for storing an image data, and the like.

The nonvolatile memory 14 is a memory (flash memory) in which the stored contents are not damaged even if the multi function peripheral 10 is turned off, and is used for storing various types of settings.

The hard disk drive 15 is a large-capacity nonvolatile memory device, and has the function as the storing unit for storing the print jobs received from the printer driver 6. Further, in the hard disk drive 15, in addition to the data of the print jobs, the image data and the like, various types of programs and data are stored.

The image reading unit 16 has the function for obtaining the image data by optically reading the original. For example, the image reading unit 16 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 17 has the function for conveying the original by feeding the original set to the original setting tray from the top sheet one by one, passing the original through the reading position of the image reading unit 16 and discharging the original to a predetermined discharge position. The image reading unit 16 has the function for reading the original set on a platen glass, and has the function for sequentially reading the original which is conveyed by the auto document feeder 17.

The printer unit 18 has the function for printing an image on the paper sheet in accordance with the image data. In this embodiment, the print unit 18 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. The image may be formed by another process.

The image processing unit 19 carries out the rasterization process for converting print data into image data, the compression/decompression process for the image data, and the like in addition to the processings, such as the enlargement/reduction and the rotation of image data.

The operation panel 20 comprises the operating unit 21 and the display unit 22. The display unit 22 has the function for displaying various types of operation windows, and comprises a liquid crystal display and the like. The operating unit 21 comprises various types of hardware keys for receiving various types of operations from the user, such as a start button, a numeric keypad and the like, and a touch screen which is provided on the display surface of the display unit 22.

The facsimile communication unit 23 has the function for transmitting and receiving the image data to/from a device having the facsimile function via a telephone line.

The network communication unit 24 has the function for communicating with the PC 5, various types of external devices and the like via the network.

The authentication unit 25 has the function for authenticating the user. The authenticating method to be adopted in the authentication unit 25 may be optional, for example, a user may be authenticated by entering a user ID and a password, by detecting an ID card or by the vein authentication.

The CPU 11 has the function as the operation window setting change management unit 27, the execution management unit 28 and the change informing unit 29 by executing the programs. The operation window setting change management unit 27 has the function for customizing various types of operation windows to be displayed on the display unit 22 of the operation panel 20, in accordance with the personal panel setting information. Further, the operation window setting change management unit 27 receives the change in the personal panel setting information. The personal panel setting information is a group of the setting values for customizing the operation window. For example, the personal panel setting information is the information relating to the layout of the operation window to be displayed on the multi function peripheral 10 or the like and/or the information relating to the default setting value of the setting item displayed in the operation window. The program for customizing and displaying the operation window is stored in the multi function peripheral 10. The multi function peripheral 10 obtains the personal panel setting information from the PC 5 and the like.

The execution management unit 28 manages the execution of the print jobs. In this embodiment, in case that the user authenticated by the user authentication is coincident with the user indicated in the user information included in the stored print job, the printing can be carried out in accordance with the stored print job. The change informing unit 29 transmits the changed personal panel setting information to the printer driver 6 which transmits the print job in case that the operation for changing the personal panel setting information added to the print job is received.

The printer driver 6 has the function as the setting information management unit 7 for obtaining the personal panel setting information of the user having the printer driver 6 and for storing the obtained personal panel setting information in the storing unit of the PC 5, and the job preparation and transmission unit 8 for preparing the print job including the identification information of the user having the printer driver 6 and the stored personal panel setting information and for transmitting the prepared print job to the multi function peripheral 10. When the job preparation and transmission unit 8 receives the instruction for transmitting the print job in which the user authentication is required in order to print the document, the job preparation and transmission unit 8 prepares the print job which adds the stored personal panel setting information and transmits the prepared print job to the multi function peripheral 10. In this embodiment, the PC 5 is used by one user.

Figure 3:
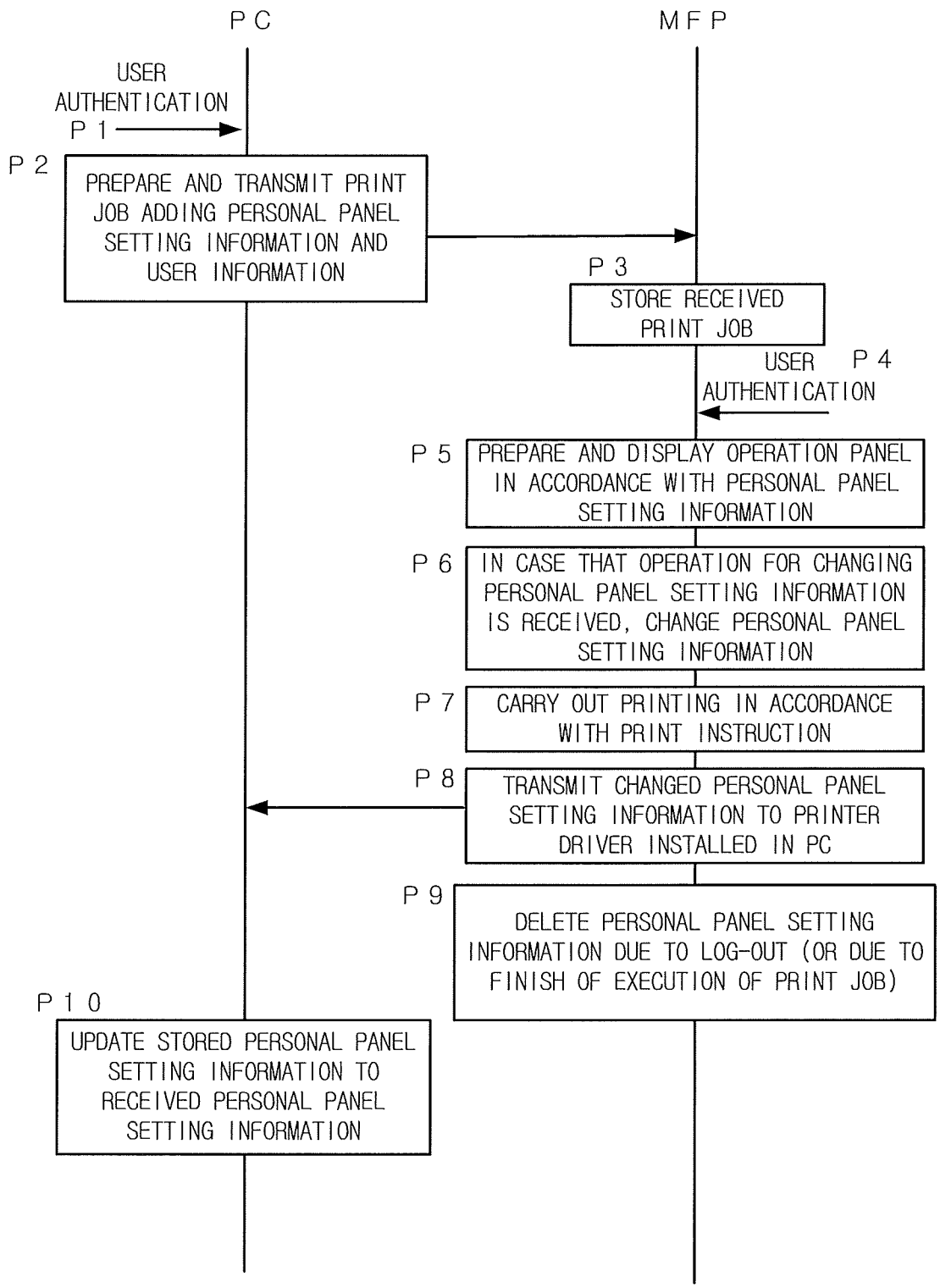
FIG. 3 is a view showing the print sequence according to the first embodiment.

FIG. 3 shows the print sequence in the print system 2 according to the first embodiment. The PC 5 receives the user authentication (P1). Then, in case that the PC 5 receives the instruction for transmitting the print job relating to the security print or the pull print in which the user authentication is required at the multi function peripheral 10 or the like when the document is printed, the job preparation and transmission unit 8 of the printer driver 6 prepares the print job which adds the personal panel setting information and the user information of the user authenticated at the PC 5 and transmits the prepared print job to the multi function peripheral 10 (P2).

The multi function peripheral 10 which receives the print job stores the received print job and the information which is added to the print job in the storing unit, such as the box for the authentication print of the user or the like (P3). When the user carries out the user authentication at the multi function peripheral 10 which receives the print job (P4), the operation window setting change management unit 27 of the multi function peripheral 10 checks whether the multi function peripheral 10 itself stores the print job of the user who carries out the user authentication at the multi function peripheral 10 (log-in user) (in the box for the authentication print of the log-in user). In case that the above print job is stored, the operation window setting change management unit 27 reads the personal panel setting information which is added to the above print job and customizes and displays the operation window in accordance with the read personal panel setting information (P5).

Further, in case that the operation for changing the personal panel setting information is received from the log-in user, the operation window setting change management unit 27 of the multi function peripheral 10 changes the stored personal panel setting information in accordance with the received operation. Further, the displayed operation window is also changed (P6). In case that the setting is changed only by receiving the normal operation via the operation window, the personal panel setting information is not changed. In case that the operation for changing the default setting of the log-in user is received in the mode for changing the default setting, the personal panel setting information is changed.

When the print jobs of the log-in user are displayed as a list among the print jobs stored in the multi function peripheral 10 and the selection of one print job and the print instruction are received from the user, the execution management unit 28 of the multi function peripheral 10 carries out the printing in accordance with the selected print job (P7). Then, the execution management unit 28 transmits the result of the execution of the print job (job history) and the like to the PC 5 which transmits the executed print job. At this time, in case that the operation for changing the personal panel setting information is received from the user in P6, the change informing unit 29 transmits the changed personal panel setting information (in this case, only the changed portion) to the PC 5 which transmits the print job (P8). When the user logs out (or when the execution of the print job is finished), the personal panel setting information of the user who logs out is deleted from the multi function peripheral 10 (P9).

In case that the setting information management unit 7 of the printer driver 6 installed in the PC 5 receives the personal panel setting information from the multi function peripheral 10, the setting information management unit 7 updates the stored personal panel setting information to the received personal panel setting information (P10).

In the above example, the case in which the number of the user of each PC 5 is limited to only one is shown. In case that the printer driver 6 is commonly used by a plurality of users, the personal panel setting information of each user is stored and the personal panel setting information of the log-in user is used.

Figure 4A:
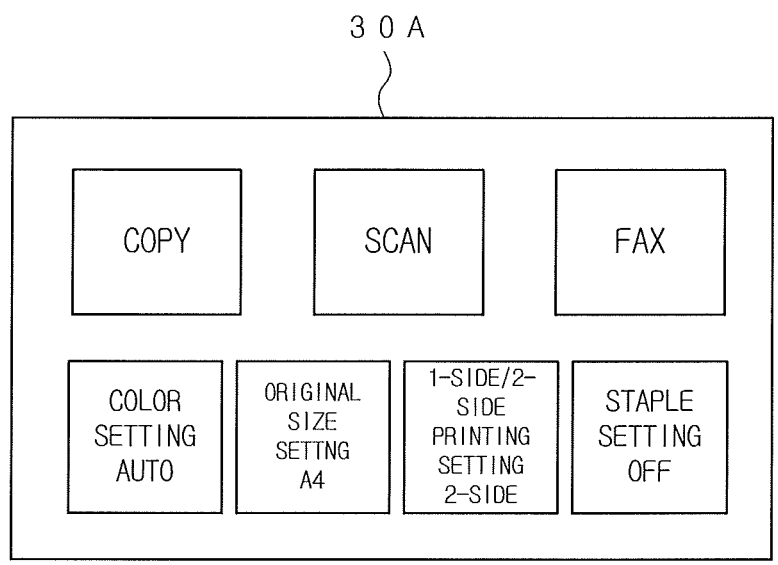
FIGS. 4A and 4B are views showing an example of the default standby window and an example of the standby window customized in accordance with the personal panel setting information.
Figure 4B:
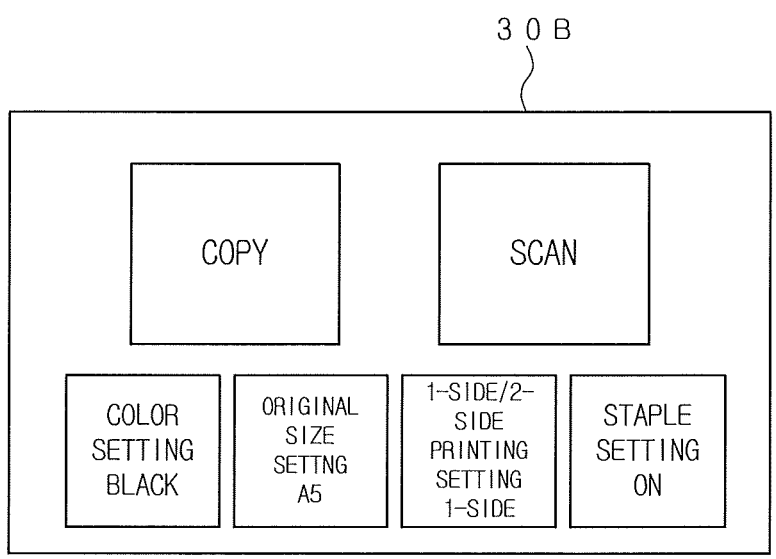

FIGS. 4A and 4B show an example of the default standby window of the multi function peripheral 10 and an example of the standby window customized in accordance with the personal panel setting information. In the default standby window shown in FIG. 4A, the copy function, the scan function and the facsimile function can be selected. On the other hand, in the customized standby window shown in FIG. 4B, the selection button of the facsimile function is deleted and only the copy function and the scan function can be selected. Further, in the default standby window, the color setting is set to Auto, the original size setting is set to A4, the 1-side/2-side printing setting is set to 2-side, and the staple setting is set to OFF. On the other hand, in the customized standby window, the color setting is changed to black, the original size setting is changed to A5, the 1-side/2-side printing setting is changed to 1-side, and the staple setting is changed to ON.

As described above, in the print system 2, various types of setting relating to the operation window can be carried out only by transmitting the personal panel setting information with the print job from the printer driver 6 installed in the PC 5. In case that the multi function peripheral 10 which is commonly used by many users stores the personal panel setting information of each user, the capacity of the memory for storing the personal panel setting information becomes large. However, in the multi function peripheral 10 of the print system 2 according to the embodiment, it is not necessary to store the personal panel setting information of each user. As a result, the burden on the multi function peripheral 10 is reduced. On the other hand, in the printer driver 6, it is sufficient to store the personal panel setting information of one user.

Second Embodiment

Figure 5:
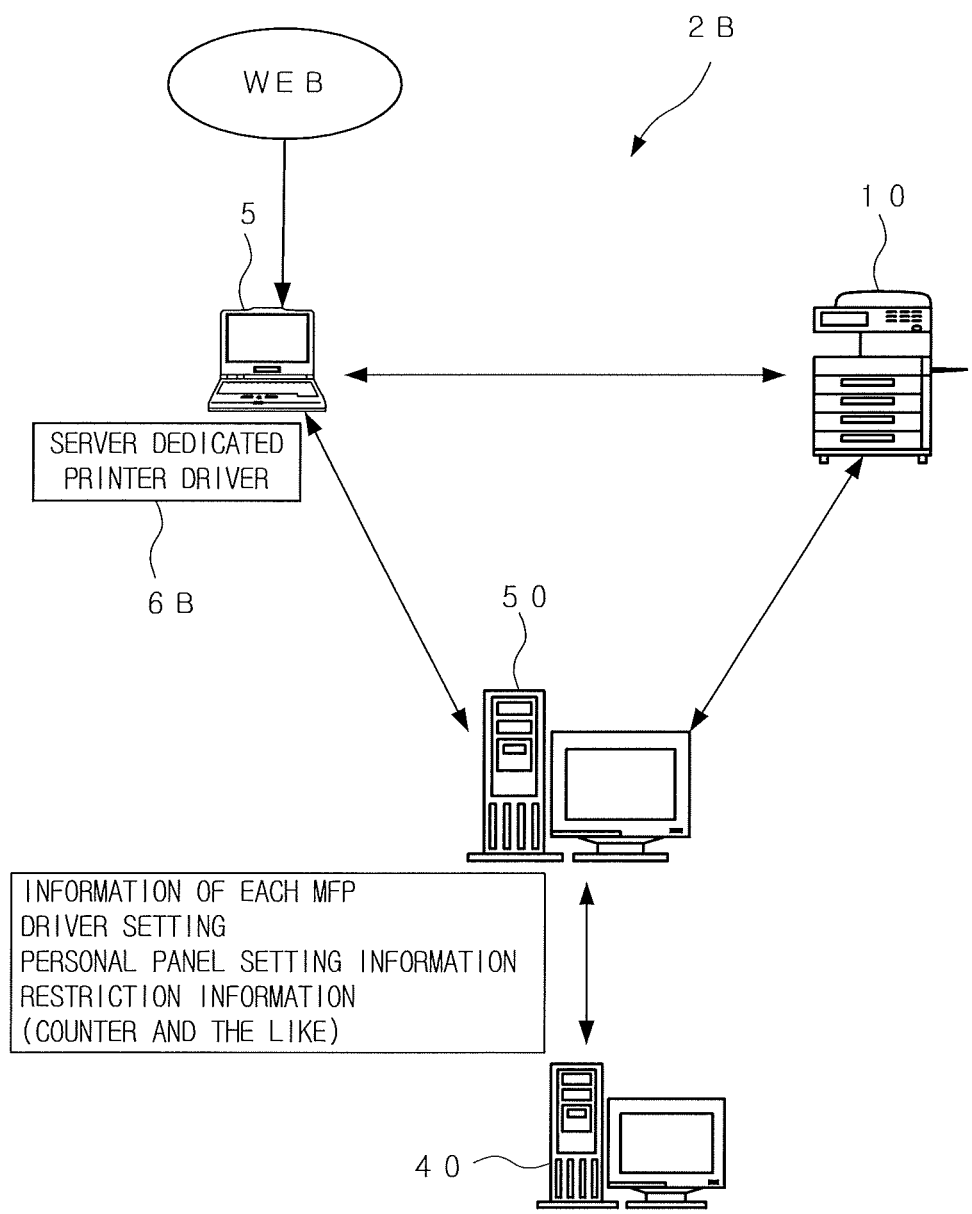
FIG. 5 is a view showing an example of the configuration of the print system according to the second embodiment.

FIG. 5 shows an example of the configuration of the print system 2B according to the second embodiment. In the print system 2B, the PC 5 which is used by the user, the multi function peripheral 10 as the print device, the print server 50 and the authentication server 40 are connected via the network. In the print system 2B, one PC 5 and one multi function peripheral 10 may be connected. However, in general, a plurality of PCs 5 and a plurality of multi function peripherals 10 are connected. The PC 5 can obtain the printer driver program for the multi function peripheral 10 from the Web.

The PC 5 is substantially the same as the PC 5 shown in the first embodiment. The printer driver to be installed is dedicated to the print server 50. This printer driver is referred to as the server dedicated printer driver 6B. The server dedicated printer driver 6B also has the function as the setting information management unit 7 and the job preparation and transmission unit 8. The configuration of the multi function peripheral 10 is the same as that of the first embodiment.

The print server 50 is a server which can handle the ubiquitous print. The authentication server 40 is a server for the user authentication.

The print server 50 stores and manages the information of each multi function peripheral 10 (the IP address, the model information and the like), the information relating to the driver setting, the personal panel setting information and the restriction information relating to the restriction of the print for each user (the counter and the like).

Figure 6:
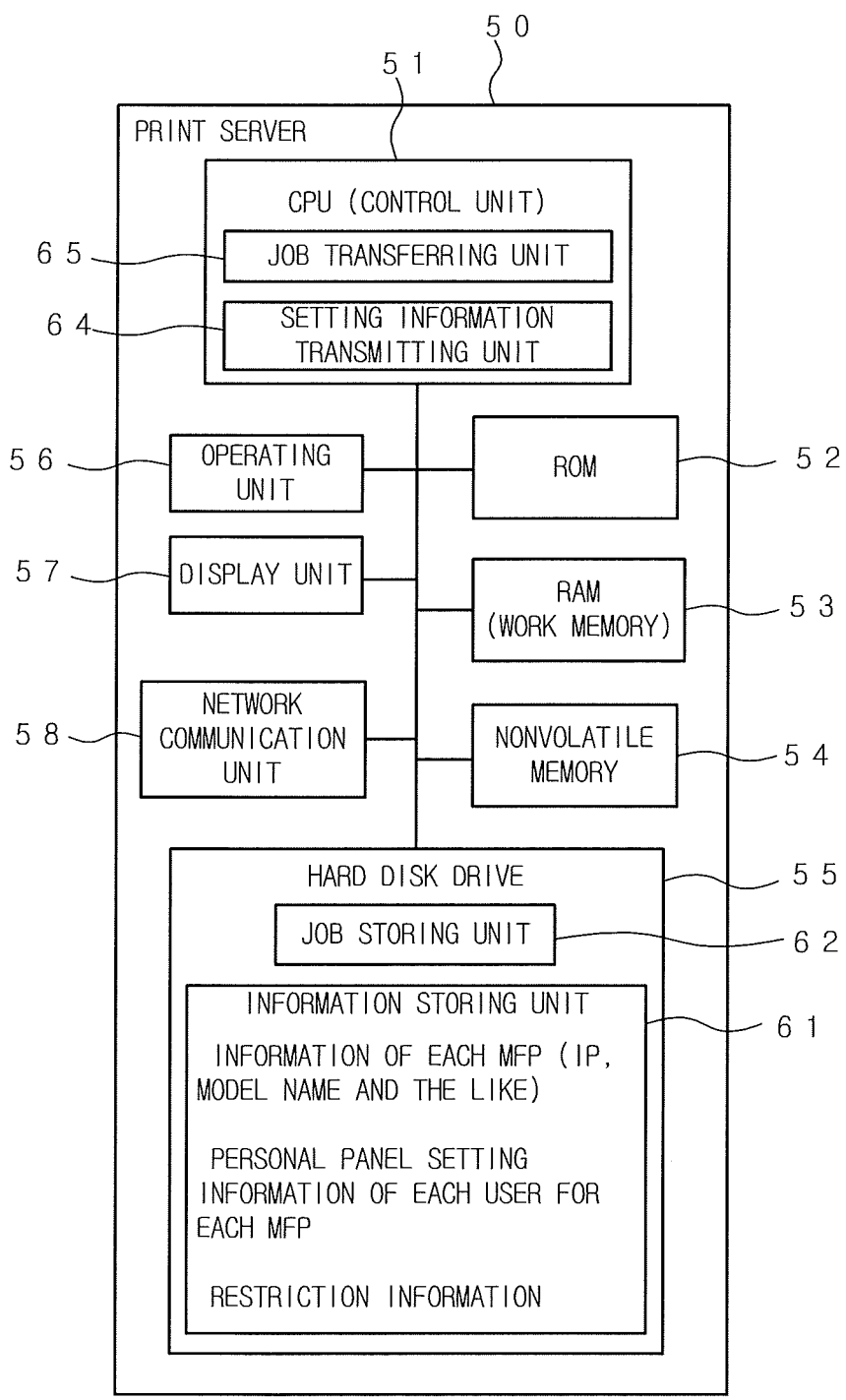
FIG. 6 is a block diagram showing the schematic configuration of the print server.

FIG. 6 is a block diagram showing the schematic configuration of the print server 50. The print server 50 comprises a CPU 51 as the control unit for entirely controlling the operation of the print server 50. The CPU 51 is connected with a ROM 52, a RAM 53, a nonvolatile memory 54, a hard disk drive 55, an operating unit 56, a display unit 57, a network communication unit 58 and the like via a bus.

By the CPU 51, a middleware, application programs and the like are executed on an OS program as a base. In the ROM 52, various types of programs are stored. By executing various types of processes by the CPU 51 in accordance with these programs, each function of the print server 50 is realized.

The RAM 53 is used as a work memory for temporarily storing various data when the CPU 51 executes the process in accordance with the programs, and the like.

The nonvolatile memory 54 is a memory (flash memory) in which the stored contents are not damaged even if the print server 50 is turned off, and is used for storing various types of settings.

The hard disk drive 55 is a large-capacity nonvolatile memory device, and stores various types of programs and data. In this embodiment, the hard disk drive 55 has the function as the information storing unit 61 for storing the information of each MFP (the IP address, the model information and the like), the information relating to the driver setting, the personal panel setting information, the restriction information relating to the restriction of the print for each user (counter and the like) and the like, and the job storing unit 62 for storing the received print jobs.

The display unit 57 has the function for displaying various types of operation windows, setting windows and the like, and comprises a liquid crystal display and the like. The operating unit 56 has the function for receiving various types of operations from the user. The network communication unit 58 has the function for communicating with the PC 5, the multi function peripheral 10, the other types of external devices via the network.

The CPU 51 has the function as the setting information transmitting unit 64 for reading the personal panel setting information of the user who is authenticated at the multi function peripheral 10 from the information storing unit 61 and transmitting the read personal panel setting information to the multi function peripheral 10, and the job transferring unit 65 for transmitting the print job of the authenticated user, which is stored in the job storing unit 62 to the multi function peripheral 10 which transmits the transfer request for transferring the print job of the authenticated user, in case that the transfer request is received from the multi function peripheral 10.

Figure 7:
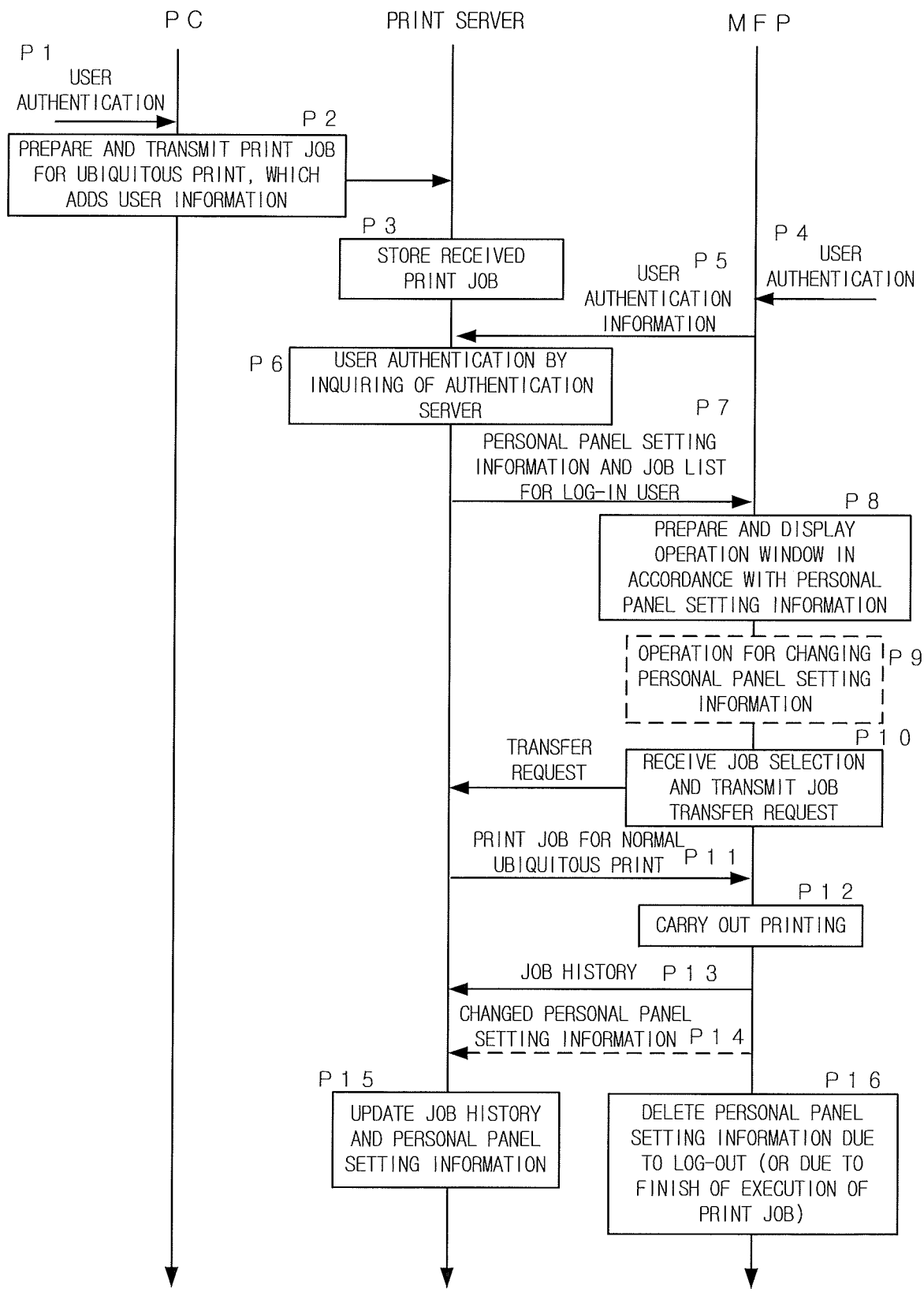
FIG. 7 is a view showing the print sequence in case that the print server normally operates.

FIG. 7 shows the print sequence in the print system 2B in case that the print server 50 normally operates. In this print sequence, each PC 5 is used by one user. The PC 5 receives the user authentication (P1). Then, in case that the server dedicated printer driver 6B installed in the PC 5 receives the instruction for transmitting the print job relating to the security print or the pull print in which the user authentication is required at the multi function peripheral 10 or the like when the document is printed, the server dedicated printer driver 6B prepares the print job which adds the user information of the user authenticated at the PC 5 and transmits the prepared print job to the print server 50 (P2).

The print server 50 which receives the above print job stores the received print job in the job storing unit 62, such as the folder of the authenticated user or the like (P3). When the user enters the user authentication information for the user authentication at any one of the multi function peripherals 10 (P4), the multi function peripheral 10 transmits the entered user authentication information to the print server 50 (P5). The print server 50 transmits the received user authentication information to the authentication server 40 to request the user authentication (P6).

When the print server 50 receives the response indicating that the user succeeds in the user authentication from the authentication server 40, the print server 50 reads the personal panel setting information of the user who succeeds in the user authentication in accordance with the user authentication information entered at the multi function peripherals 10 (referred to as the log-in user), from the hard disk drive 55. Further, the print server 50 transmits the read personal panel setting information and the list of the print jobs stored in the folder of the log-in user to the multi function peripheral 10 which transmits the user authentication information (P7).

The multi function peripheral 10 which receives the personal panel setting information and the like, temporarily stores the received personal panel setting information and customizes and displays the operation window in accordance with the personal panel setting information (P8). Further, in case that the multi function peripheral 10 receives the operation for changing the personal panel setting information from the log-in user, the multi function peripheral 10 changes the stored personal panel setting information in accordance with the received operation and changes the displayed operation window (P9).

Then, the multi function peripheral 10 displays the list of the print jobs, which is received from the print server 50. When the multi function peripheral 10 receives the selection of the print job and the print instruction from the user, the multi function peripheral 10 transmits the transfer request for transferring the selected print job, to the print server 50 (P10). The print server 50 which receives the transfer request, transmits the data of the print job requested in the transfer request to the multi function peripheral 10 which transmits the transfer request (P11).

The multi function peripheral 10 which receives the print job carries out the printing (P12). Then, the multi function peripheral 10 transmits the result of the execution of the print job (job history) and the like to the print server 50 (P13). Further, in case that the operation for changing the personal panel setting information is received, the change informing unit 29 transmits the changed personal panel setting information (in this case, only the changed portion), the user information of the log-in user and the information of the multi function peripheral 10 which executes the print job (the model information of the multi function peripheral 10 or the like) to the print server 50 (P14). When the user logs out (or when the execution of the print job is finished), the personal panel setting information of the user who logs out is deleted from the multi function peripheral 10 (P16).

The print server 50 updates the job history, the counter indicated in the restriction information and the like, which are stored therein, in accordance with the job history received from the multi function peripheral 10. Further, in case that the print server 50 receives the personal panel setting information from the multi function peripheral 10, the print server 50 updates the personal panel setting information which is used for this multi function peripheral 10 and for the user indicated in the received user information, to the received personal panel setting information (P15).

The printing which is carried out via the print server 50 in accordance with the above-described print sequence is referred to as the normal ubiquitous print. As described above, when the print server 50 operates, the normal ubiquitous print is carried out. Then, each multi function peripheral 10 displays the operation window customized in accordance with the personal panel setting information received from the print server 50.

Next, the process which is carried out when the print server 50 is down, will be explained.

In case that the print server 50 is down, as described in the first embodiment, the print job which adds the personal panel setting information and the user information is transmitted from the PC 5 to the multi function peripheral 10. Therefore, it is necessary to obtain the program of the local printer driver which can transmit the print job directly to the multi function peripheral 10 and install the obtained local print driver in the PC 5. Further, it is necessary that the printer driver installed in the PC 5 obtains the personal panel setting information of the user. This process will be explained below.

Figure 8:
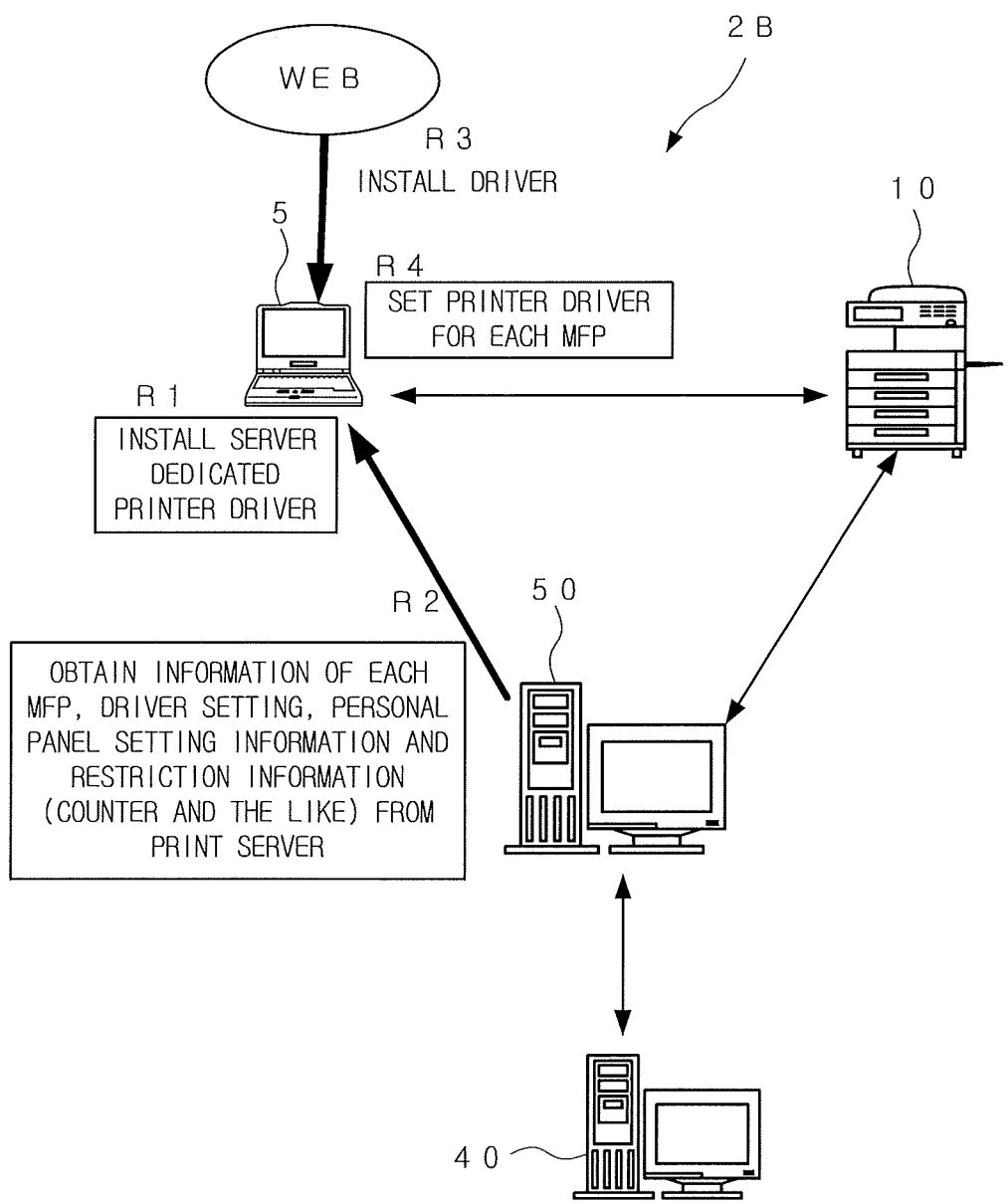
FIG. 8 is a view showing the situation in which the PC obtains the local printer driver for each multi function peripheral.

FIG. 8 shows the situation in which the PC 5 obtains the local printer driver 9 for each multi function peripheral 10. When the server dedicated printer driver 6B is installed in the PC 5 (R1), the server dedicated printer driver 6B obtains the information of all of the multi function peripherals 10 (MFP information) on the network from the print server 50 (R2).

Then, in the background process, the server dedicated printer driver 6B searches the program of the local printer driver 9 for each device model indicated in the MFP information obtained from the print server 50 on the Web and downloads the program of the local printer driver 9. Then, the server dedicated printer driver 6B installs the program in the PC 5. Further, by using the information, such as the IP address of each multi function peripheral 10 and the like, which is obtained from the print server 50, the server dedicated printer driver 6B sets each local printer driver 9 so as to be able to use each printer driver 9 at any time (R4). Each local printer driver 9 is under the control of the server dedicated printer driver 6B. The server dedicated printer driver 6B can add optional information to the print job prepared by the local printer driver 9.

Next, the print sequence (referred to as "print sequence A") to be carried out when the print server 50 is down will be explained with reference to FIG. 9. Firstly, when the server dedicated printer driver 6B installed in the PC 5 receives the print instruction from the user, the server dedicated printer driver 6B checks whether the print server 50 can be used or not in accordance with the communication state. When it is judged that the PC 5 cannot communicate with the print server 50 and the print server 50 cannot be used (the print server 50 is down) (or when the instruction for directly requesting the multi function peripheral 10 to print the document without interposing the print server 50 is received from the user), the server dedicated printer driver 6B transfers the management authority for managing the restriction of the number of the printed sheets and the like, from the print server 50 to the server dedicated printer driver 6B. Then, the server dedicated printer driver 6B uses the local printer driver 9 to prepare the print job for the server non-interposing mode. In the print job for the server non-interposing mode, the personal panel setting information, the user information and the server non-interposing mode information is added.

The server non-interposing mode information may be always added to the print job as the bit indicating whether the print mode is the server non-interposing mode or not. Alternatively, the server non-interposing mode information may be added to the print job only when the print mode is the server non-interposing mode or only when the print mode is not the server non-interposing mode. The form of the server non-interposing mode information is optional if the device which receives the server non-interposing mode information can recognize whether the print mode is the server non-interposing mode or not.

Figure 9:
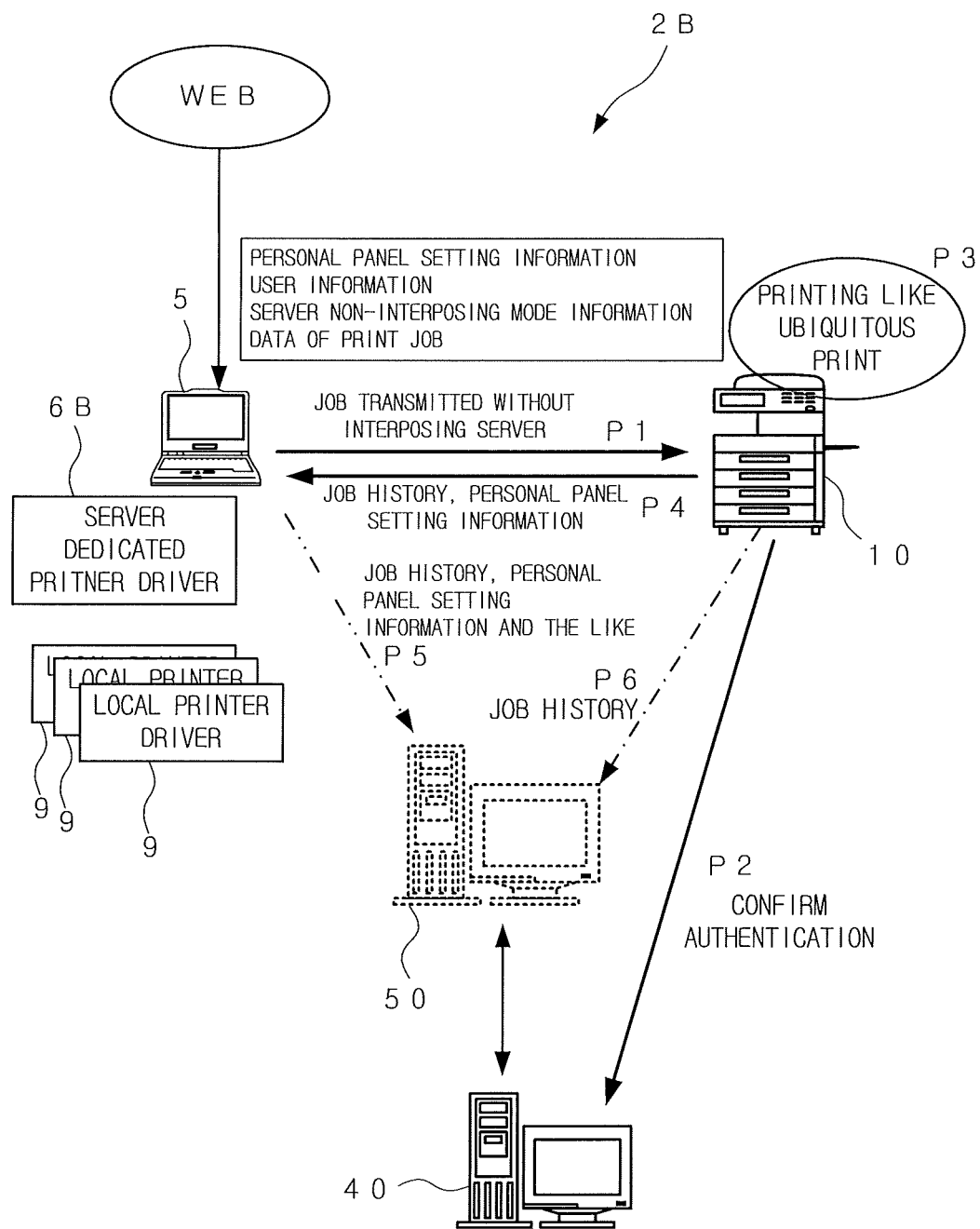
FIG. 9 is a view showing the situation in case that the print server is down.

The server dedicated printer driver 6B checks the upper limit of the number of the printed sheets and the restriction of the color setting, and uses all of the local printer drivers 9 which are under the control of the server dedicated printer driver 6B to transmit the print job for the server non-interposing mode to all of the multi function peripherals 10 corresponding to the used local printer drivers 9 (or the multi function peripherals 10 having the high priority) (P1 in FIG. 9).

When each multi function peripheral 10 receives the print job in which the server non-interposing mode information and the user information is added, the multi function peripheral 10 stores the data of the print job in the box for the authentication print of the user indicated in the received user information. Further, the multi function peripheral 10 stores the received user information and the received personal panel setting information so as to relate the user information to the personal panel setting information. The multi function peripheral 10 sets the flag indicating the server non-interposing mode. When there is not a box for the authentication print of the user indicated in the user information, the multi function peripheral 10 prepares a new box.

The multi function peripheral 10 which receives the login operation from the user by using the IC card or the like, confirms whether the flag of the server non-interposing mode is set or not. In case that the flag of the server non-interposing mode is set, the multi function peripheral 10 directly communicates with the authentication server 40 and carries out the user authentication in accordance with the user information obtained from the IC card or the like (P2).

When the user succeeds in the user authentication and logs in the multi function peripheral 10, the multi function peripheral 10 uses the personal panel setting information stored so as to relate to the user information of the log-in user and changes the operation window to the window customized for the log-in user (P3 in FIG. 9). Thereby, the arrangement of the buttons in the operation window and the setting status are the same as those of the normal ubiquitous print in which the print job is transmitted via the print server 50. As a result, it is possible to provide the user with the same operatability as the normal ubiquitous print in which the print job is transmitted via the print server 50. The multi function peripheral 10 which this user logs in and at which the printing is carried out is referred to as the output device.

The multi function peripheral 10 which is the output device, displays the list of the print jobs stored in the box for the authentication print of the log-in user and receives the selection of the print job. The multi function peripheral 10 executes the selected print job. The multi function peripheral 10 confirms the status of the print server 50 after the printing. In case that the print server 50 is recovered and operates, the multi function peripheral 10 transmits the management information (job history and the like) and the personal panel setting information to the print server 50. On the other hand, in case that the multi function peripheral 10 cannot access to the print server 50, the multi function peripheral 10 transmits the management information and the personal panel setting information (when the personal panel setting information is changed) to the server dedicated printer driver 6B installed in the PC 5 of the log-in user. Then, the multi function peripheral 10 cancels the server non-interposing mode and deletes the personal panel setting information (P4 in FIG. 9).

The server dedicated printer driver 6B uses the received management information and updates the current management information (the number of the printed sheets which are used by the user, and the like) so as to be able to use the management information in the next printing. Further, in case that the server dedicated printer driver 6B receives the personal panel setting information from the multi function peripheral 10, the server dedicated printer driver 6B updates the personal panel setting information in accordance with the received personal panel setting information.

In case that the user enters the next print instruction in the PC 5, the server dedicated printer driver 6B checks the status of the print server 50. In case that the PC 5 can communicate with the print server 50, the server dedicated printer driver 6B transmits the updated management information stored therein to the print server 50 (P5 in FIG. 9).

On the other hand, the multi function peripheral 10 which is the output device, monitors whether the print server 50 is recovered. When the multi function peripheral 10 can access to the print server 50, the multi function peripheral 10 transmits the management information stored therein to the print server 50 (P6 in FIG. 9).

The print server 50 merges and integrates the management information obtained from the server dedicated printer driver 6B installed in the PC 5 and the management information obtained from the multi function peripheral 10 which is the output device, in the latest state in accordance with the time stamp and the like. Then, the print server 50 updates the management information for the multi function peripheral 10 which is the output device and for the user who instructs the printing.

Next, another method in which the server dedicated printer driver 6B installed in the PC 5 obtains each local printer driver 9 and sets each local printer driver 9 so as to be able to use each printer driver 9 will be explained.

Figure 10:
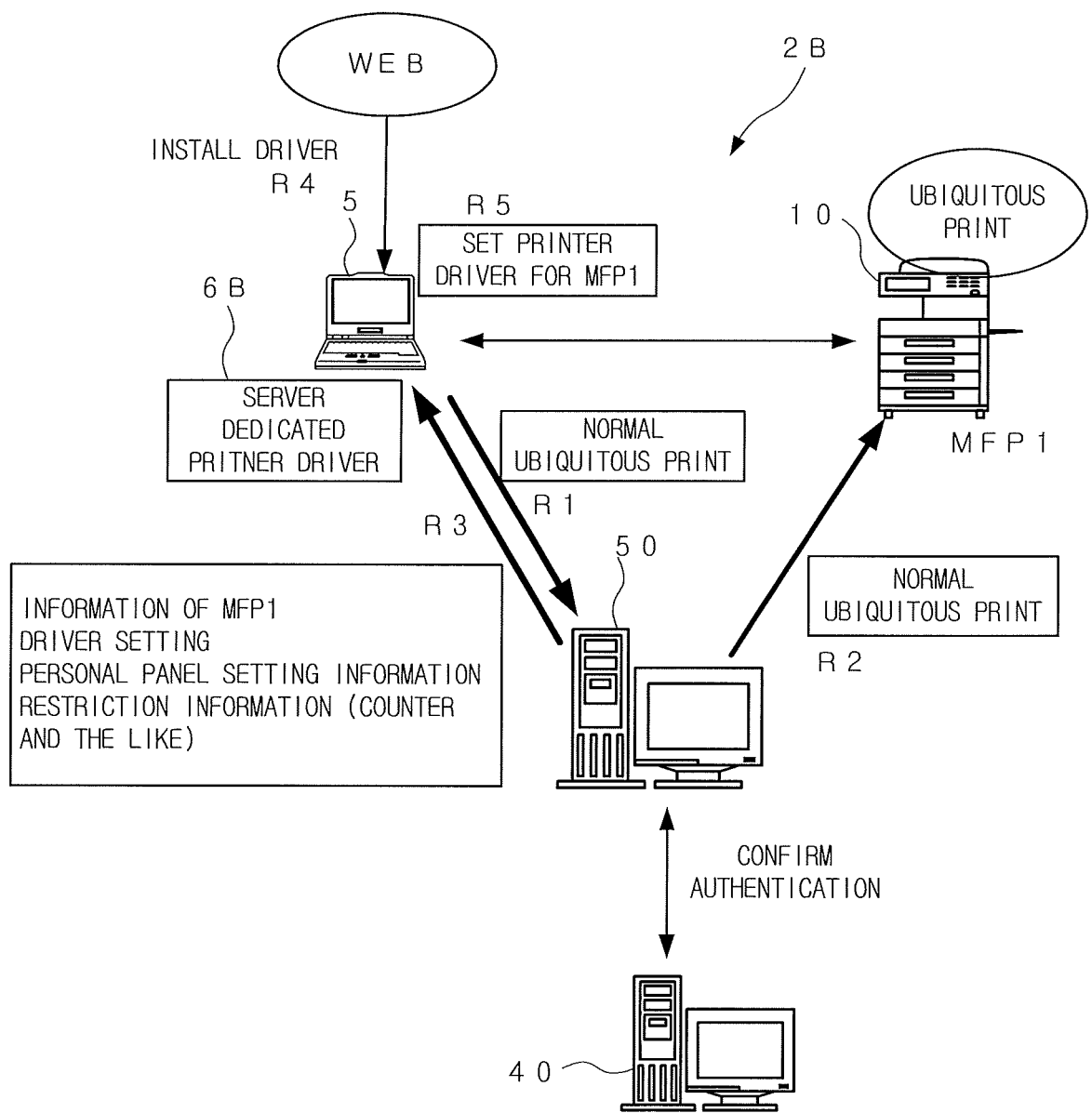
FIG. 10 is a view showing the situation in which when the normal ubiquitous print is carried out, the PC obtains and sets the local printer driver for the multi function peripheral.

In an example of FIG. 8, when the server dedicated printer driver 6B is installed in the PC 5, each local printer driver 9 for all of the multi function peripherals on the network is obtained via the Web. On the other hand, in an example shown in FIG. 10, when the normal ubiquitous print is carried out, the local printer driver 9 for the multi function peripheral 10 which is the output device is obtained and set.

That is, the user transmits the print job for the normal ubiquitous print from the PC 5 to the print server 50 (R1). Further, the user logs in MFP1, and MFP1 executes the print job (R2).

At this time, the print server 50 transmits the IP address information of MFP1, the model information of MFP1, the user information of the user who logs in MFP1 and the personal panel setting information of the log-in user and for MFP1, to the server dedicated printer driver 6B installed in the PC 5 which transmits the print job executed by MFP1 (R3).

Then, in the background process, the server dedicated printer driver 6B installed in the PC 5, which receives the above information, searches the program of the local printer driver 9 for MFP1 on the Web and downloads the program of the local printer driver 9. Then, the server dedicated printer driver 6B installs the program in the PC 5 (R4). Further, by using the information, such as the IP address of MFP1 and the like, which is obtained from the print server 50, the server dedicated printer driver 6B sets the local printer driver 9 for MFP1 so as to be able to use the printer driver 9 at any time (R5).

When the print server 50 is down, basically, the printing is carried out as shown in the print sequence A explained with reference to FIG. 9. However, the PC 5 transmits the print job only to the MFP corresponding to the local printer driver 9 which has been installed and set. For example, when the instruction for transmitting the print job is received in the situation in which the print server 50 is down, in case that only the local printer driver 9 for MFP1 is installed, the PC 5 transmits the print job only to MFP1 by using the local printer driver 9 for MFP1.

MODIFIED EXAMPLE

In the print sequence A, the multi function peripheral 10 which is the output device, displays the list of the print jobs stored in the box for the authentication print of the log-in user and receives the selection of the print job. However, in case that the print server 50 is recovered at this time, the multi function peripheral 10 may obtain the list of the print jobs of the log-in user, which are stored in the print server 50, from the print server 50. Then, the multi function peripheral 10 may integrate the list obtained from the print server 50 and the list of the print jobs stored in the box for the authentication print of the log-in user into one list and may display the list obtained by integrating the lists. As a result, it seems as if these print jobs are stored in the same place. As described above, it is not necessary that the user is aware of the storing place in which the print jobs are stored.

Figure 11:
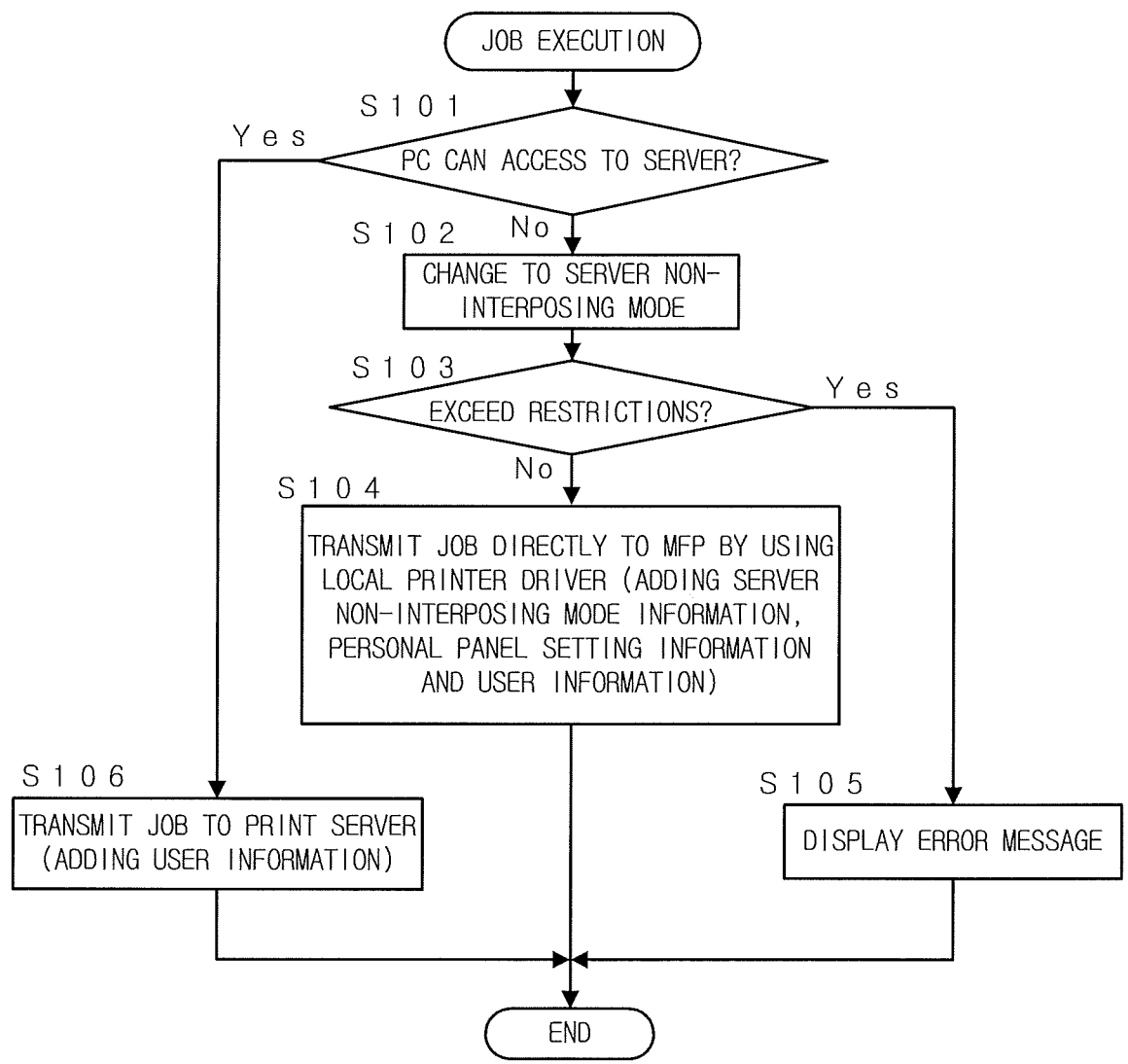
FIG. 11 is a flowchart showing the process which is carried out by the server dedicated printer driver installed in the PC.

FIG. 11 is a flowchart showing the process which is carried out by the server dedicated printer driver 6B installed in the PC 5. When the instruction for preparing and transmitting the print job is received from the user, the server dedicated printer driver 6B installed in the PC 5 checks whether the print server 50 can be used or not in accordance with the communication state (Step S101). In case that the PC 5 can access to the print server 50 (Step S101; Yes), the server dedicated printer driver 6B prepares the print job for the normal ubiquitous print (in the print job, the user information is added, but the personal panel setting information is not added), and transmits the prepared print job to the print server 50 (Step S106).

In case that the PC 5 cannot access to the print server 50 (Step S101; No), the server dedicated printer driver 6B changes the print mode to the server non-interposing mode in which the server dedicated printer driver 6B manages the restriction of the number of the printed sheets and the like (Step S102). Further, the server dedicated printer driver 6B checks whether the current print job exceeds the upper limit of the number of the printed sheets and the restriction of the color setting (Step S103).

In case that the current print job exceeds the above restrictions (Step S103; Yes), the server dedicated printer driver 6B displays the error message (Step S105) and the process is ended. In case that the current print job does not exceed the above restrictions (Step S103; No), the server dedicated printer driver 6B prepares the print job to be transmitted directly to the MFP by using the local print driver 9. Further, the server dedicated printer driver 6B adds the user information of the user who logs in the PC 5 and the personal panel setting information of the user to the print job, and transmits the print job to the MFP corresponding to the local printer driver 9 (Step S104). Then, the process is ended. In case that there are a plurality of local printer drivers 9, the server dedicated printer driver 6B instructs all of the local printer drivers 9 to prepare and transmit the print job.

Further, in case that the error message is displayed in Step S105, the server dedicated printer driver 6B cancels the server non-interposing mode immediately. In case that the server dedicated printer driver 6B transmits the print job directly to the MFP by using the local printer driver 9 in Step S104, when the notification indicating that the print job is executed (job history or the like) is received or when the PC 5 can access to the print server 50 (Step S101; Yes) in the next process, the server dedicated printer driver 6B cancels the server non-interposing mode.

Figure 12:
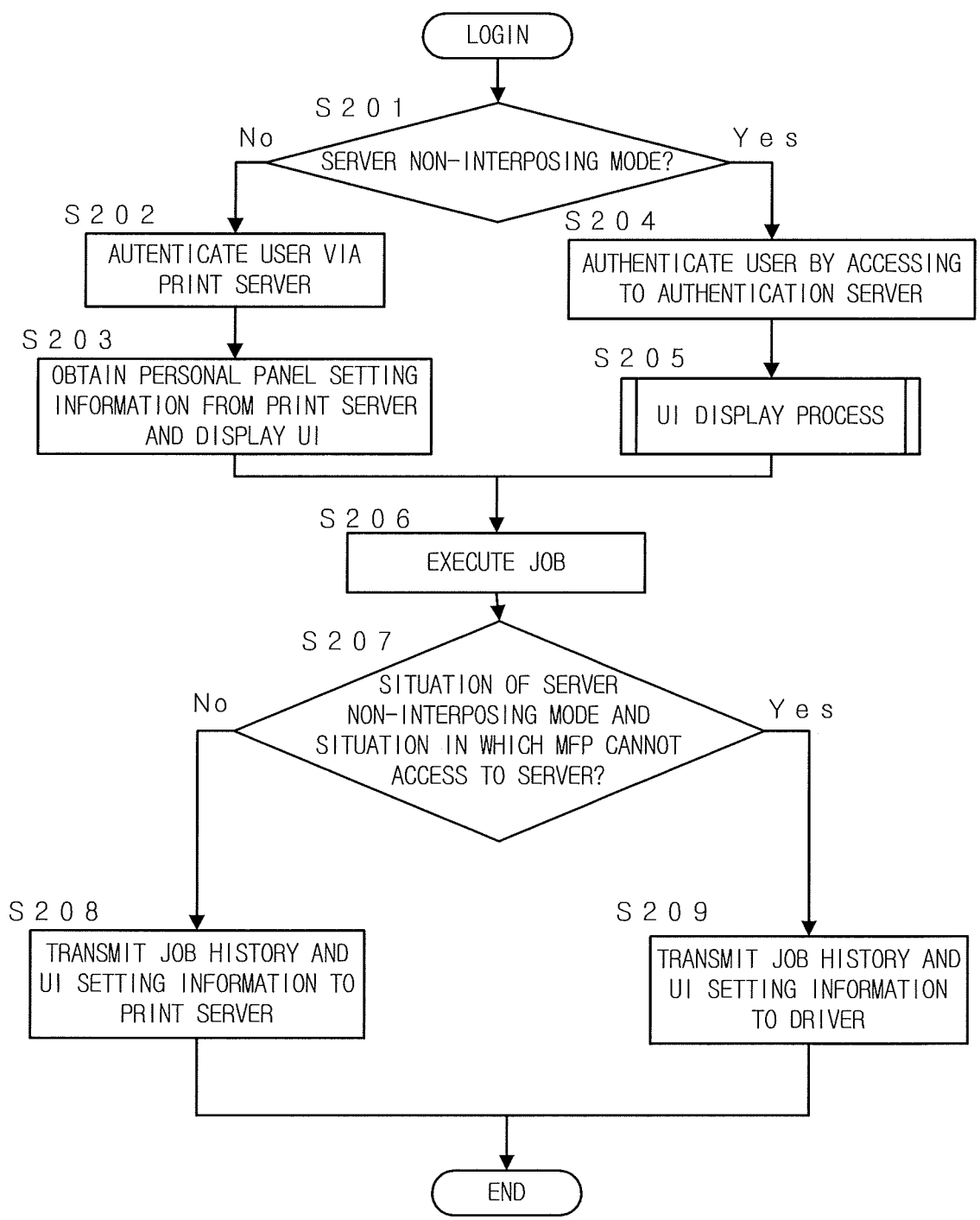
FIG. 12 is a flowchart showing the process which is carried out by the multi function peripheral in case that a user logs in the multi function peripheral.

FIG. 12 is a flowchart showing the process which is carried out by the multi function peripheral 10 in case that the user logs in the multi function peripheral 10. When the user logs in the multi function peripheral 10, firstly, the multi function peripheral 10 checks whether the flag of the server non-interposing mode is set or not (Step S201). In case that the flag of the server non-interposing mode is not set (Step S201; No), the user authentication is carried out by the authentication server 40 via the print server 50 (Step S202). When the user succeeds in the user authentication, the multi function peripheral 10 obtains the personal panel setting information from the print server 50 and displays the operation window (UI) customized in accordance with the obtained personal panel setting information (Step S203). The process proceeds to Step S206.

In case that the flag of the server non-interposing mode is set (Step S201; Yes), the multi function peripheral 10 accesses directly to the authentication server 40 to carry out the user authentication (Step S204). When the user succeeds in the user authentication, the multi function peripheral 10 displays the customized operation window (UI) by using the personal panel setting information of the log-in user (Step S205). The process proceeds to Step S206.

Then, the multi function peripheral 10 executes the print job selected from the list of the print jobs (Step S206). When the execution of the print job is finished, the multi function peripheral 10 judges whether the situation of the print system 2B is the situation in which the flag of the server non-interposing mode is set and the situation in which the multi function peripheral 10 cannot currently access to the print server 50 (Step S207).

In case that the situation of the print system 2B is the situation in which the flag of the server non-interposing mode is set and the situation in which the multi function peripheral 10 cannot currently access to the print server 50 (Step S207; Yes), the multi function peripheral 10 transmits the job history (the result of the execution of the job) and the personal panel setting information (only the changed portion) to the printer driver 6 which transmits the executed print job (Step S209). Then, the process is ended.

In case that the situation of the print system 2B is the situation the flag of the server non-interposing mode is not set or the situation in which the multi function peripheral 10 can currently access to the print server 50 (Step S207; No), the multi function peripheral 10 transmits the job history and the personal panel setting information to the print server 50 (Step S208). Then, the process is ended.

Figure 13:
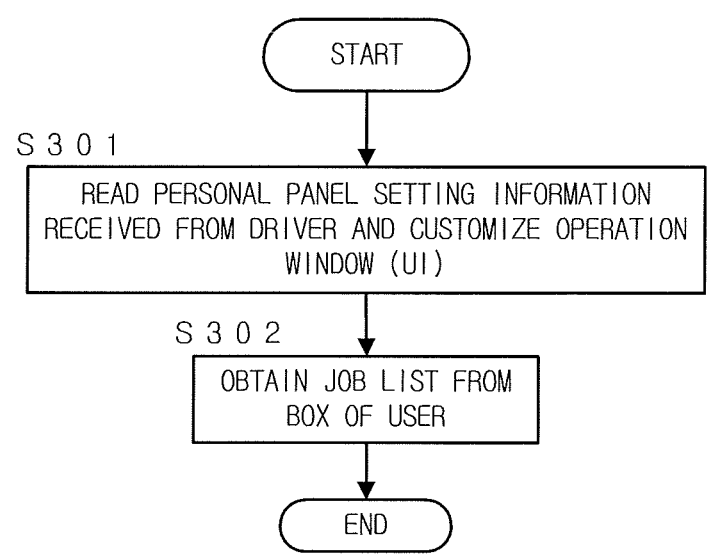
FIG. 13 is a flowchart showing the detail of Step S205 in FIG. 12.

FIG. 13 shows the detail of Step S205 in FIG. 12. The multi function peripheral 10 reads the personal panel setting information of the log-in user, which is received together with the print job from the printer driver 6 (or the server dedicated printer driver 6B) installed in the PC 5 and is stored. Then, the multi function peripheral 10 displays the operation window (UT) customized in accordance with the read personal panel setting information (Step S301). Further, when the list of the print jobs is displayed, the multi function peripheral 10 prepares and displays the list of the print jobs stored in the box for the authentication print of the log-in user (Step S302).

As described above, in each of the print systems 2 and 2B, it is possible to display the operation window customized for each user without a large burden on each multi function peripheral 10.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

The print server 50 shown in the embodiment is not limited to the ubiquitous server, and may be another print server.

In the embodiments, the print device is the multi function peripheral 10. However, the print device may be a device having the print function. For example, the print device may be a device having only the print function.

In the second embodiment, the server non-interposing mode information is added to the print job. However, it is not necessary to add the server non-interposing mode information. That is, in case that the personal panel setting information is included in the print job, the operation window is customized and displayed by using the personal panel setting information. On the other hand, in case that the personal panel setting information is not included in the print job, the default operation window is displayed. Further, according to the IP address of the device which transmits the print job, it may be judged whether the print job is received directly from the PC 5.

In at least one of the embodiments, the printer driver prepares the print job including the user identification information and the personal panel setting information and transmits the prepared print job to the print device. The print device temporarily stores the received print job. When the user is authenticated, the print device allows the print job of the authenticated user to be executed. Further, the print device customizes the operation window in accordance with the personal panel setting information of the authenticated user and displays the customized operation window.

In at least one of the embodiments, in case that the personal panel setting information is changed in the print device, the information relating to the change in the personal panel setting information is transmitted to the printer driver. Then, the personal panel setting information stored by the printer driver is updated.

In at least one of the embodiments, the print system further comprises the print server which enables the ubiquitous print. In general, the printer driver carries out the printing via the print server. In this case, the print server adds the personal panel setting information to the print job. When the server is down, the print job to which the personal panel setting information is added is transmitted from the printer driver to the print device directly.

In at least one of the embodiments, even if the print server is recovered and the print device can access to the print server, in case that the print device stores the print job of the log-in user, which is received from the printer driver directly, the print device displays only the stored print job of the log-in user in the job list.

In at least one of the embodiments, in case that the print server is not recovered, the print device displays only the print job of the log-in user, which is received from the printer driver directly, in the job list. On the other hand, in case that the print server is recovered, the print device displays the print job of the log-in user, which is received from the printer driver directly and the print job of the log-in user, which is stored in the print server, in the job list.

In at least one of the embodiments, in case that the personal panel setting information is changed in the print device, the information relating to the change in the personal panel setting information is transmitted to the printer driver and the print server. The personal panel setting information is updated in each of the printer driver and the print server.

In at least one of the embodiments, because the personal panel setting information is deleted from the print device after the personal panel setting information is used, the storing area of the print device is not oppressed.

In at least one of the embodiments, the printer driver transmits the print job including the personal panel setting information and the user identification information to the print device.

In at least one of the embodiments, the print server which can handle the ubiquitous print is provided. In case that the print job is transmitted to the print device via the server, the personal panel setting information is added in the print server.

According to the print system and the non-transitory recording medium storing a computer readable program, it is possible to display the operation window customized for each user on the print device without increasing the burden on the print device even if the server is down or the like.

Although embodiments of the present invention have been described and illustrated in detail, the disclosed embodiments are made for purpose of illustration and example only and not limitation. The scope of the present invention should be interpreted by terms of the appended claims.

What is claimed is:

1. A print system, comprising:
    a printer driver; and
    a print device,
    wherein the printer driver obtains from the print device personal panel setting information of a user having the printer driver and stores the personal panel setting information in a storing memory, and prepares a print job including identification information of the user and the stored personal panel setting information and transmits the print job to the print device; and
    the print device comprises:
        a first job memory which stores the print job received from the printer driver; and
        a first hardware processor which is configured to:
            allow a printing in accordance with the print job in case that an authenticated user is coincident with the user who is indicated in the identification information included in the print job,
            display an operation window which is customized in accordance with the personal panel setting information included in the print job in case that the authenticated user is coincident with the user who is indicated in the identification information,
            customize the personal panel setting information included with the print job in response to an operation input to the print device by the user, and transmit the customized personal panel setting information to the printer driver.

2. The print system of claim 1, wherein
in the print device, in case that an operation for changing the personal panel setting information included in the print job is received, the first hardware processor transmits the changed personal panel setting information to the printer driver which transmits the print job, and
the printer driver updates the personal panel setting information stored in the storing memory in accordance with the changed personal panel setting information received from the print device.

3. The print system of claim 1, further comprising a print server, wherein
the printer driver can transmit the print job to the print server;
the print server comprises:
an information memory which stores the personal panel setting information of each user;
a second job memory which stores the print job received from the printer driver; and
a second hardware processor which reads the personal panel setting information of the authenticated user who is authenticated at the print device from the information memory and transmits the read personal panel setting information to the print device,
wherein in the print server, in case that a request for transferring the print job of the authenticated user is received from the print device, the second hardware processor transmits the print job which is stored in the second job memory and is designated in the request, to the print device which transmits the request, and
the printer driver displays the operation window customized in accordance with the personal panel setting information received from the print server, and transmits the request to the print server and executes the print job received from the print server according to the request.

4. The print system of claim 3, wherein the printer driver includes information for judging that the print job is transmitted to the print device without interposing the print server, in the print job to be transmitted to the print device.

5. The print system of claim 3, wherein in case that the print device stores the print job of the authenticated user, the first hardware processor of the print device displays a list of the print job which can be executed, and
the first hardware processor includes, in the list, only the print job of the authenticated user among the print jobs stored in the print device.

6. The print system of claim 3, wherein the first hardware processor of the print device displays a list of the print job which can be executed,
in case that the list is displayed in a situation in which the print device stores the print job of the authenticated user and in a situation in which the print device cannot access to the print server, the first hardware processor includes, in the list, only the print job of the authenticated user among the print jobs stored in the print device,
in case that the list is displayed in the situation in which the print device stores the print job of the authenticated user and in a situation in which the print device can access to the print server, the first hardware processor includes, in the list, the print job of the authenticated user among the print jobs stored in the print device and the print job of the authenticated user, which is stored in the print server.

7. The print system of claim 3, wherein
in the print device, in case that the an operation for changing the personal panel setting information received from the printer driver is received, the first hardware processor transmits the changed personal panel setting information to the printer driver and the print server; and
each of the printer driver and the print server which receives the changed personal panel setting information, updates the stored personal panel setting information in accordance with the changed personal panel setting information.

8. The print system of claim 3, wherein when the printer driver is installed in an information processing device, the printer driver obtains the personal panel setting information of the user having the printer driver from the print server.

9. The print system of claim 1, wherein the first hardware processor of the print device deletes the personal panel setting information of the authenticated user from the print device when the authenticated user logs out the print device or when an execution of the print job of the authenticated user is finished.

10. A non-transitory recording medium storing a computer readable program which is executed by an information processing device,
wherein the program causes the information processing device to function as the printer driver of the print system of claim 1.

11. The print system of claim 1, wherein the personal panel setting information is information relating to a layout of the operation window to be displayed on the print device and/or information relating to a default setting value of a setting item displayed in the operation window.

12. The non-transitory recording medium of claim 1, wherein the personal panel setting information is information for customizing an appearance of the operation window displayed by the first hardware processor.

13. A non-transitory recording medium storing a computer readable program of a printer driver which is executed by an information processing device,
wherein the program causes the information processing device to:
store personal panel setting information of a user having the printer driver, the personal panel setting information being a group of setting values for displaying an operation window of each user at a print device;
prepare a print job including identification information of the user having the printer driver and the stored personal panel setting information, and transmit the print job to the print device;
received the personal panel setting information from the print device after the personal panel setting information has been modified by the print device in response to an operation input to the print device by the user, and store the modified personal panel setting information.

14. The non-transitory recording medium of claim 13, wherein the program further causes the information processing device to:
select one of transmitting of the print job to a print server and transmitting of the print job to the print device; and
transmit the print job to the print server in case that the transmitting of the print job to the print server is selected,
wherein in case that the transmitting of the print job to the print device is selected, the information processing device prepares the print job including the identification information of the user having the printer driver and the personal panel setting information stored in the information processing device, and transmits the print job to the print device, and wherein the print server stores the personal panel setting information of each user, stores the print job received from the printer driver and transmits the personal panel setting information of the user authenticated at the print device to the print device, and in case that a request for transferring the print job of the authenticated user is received from the print device, the print server transmits the print job designated in the request among the stored print jobs to the print device which transmits the request.

15. The non-transitory recording medium of claim 14, wherein in case that the information processing device prepares the print job including the identification information of the user having the printer driver and the personal panel setting information stored in the information processing device, and transmits the print job to the print device, information for judging that the print job is transmitted to the print device without interposing the print server is included in the print job.

16. The non-transitory recording medium of claim 14, wherein when the printer driver is installed in the information processing device, the information processing device obtains the personal panel setting information of the user having the printer driver from the print server.

17. The non-transitory recording medium of claim 13, wherein the personal panel setting information is information relating to a layout of the operation window to be displayed on the print device and/or information relating to a default setting value of a setting item displayed in the operation window.

18. The non-transitory recording medium of claim 13, wherein the personal panel setting information is information for customizing an appearance of the operation window.

19. A print system, comprising:
a printer driver; and
a print device comprising:
an authentication unit for authenticating a user at the print device;
a first job memory which stores a print job received from the printer driver, the print job including identification information of the user and personal panel setting information stored in a storing memory of the printer driver; and
a first hardware processor which is configured to:
allow a printing in accordance with the print job in case that an authenticated user previously registered with the print device is coincident with the user who is indicated in the identification information included in the print job,
display an operation window in accordance with the personal panel setting information included in the print job in case that the authenticated user is coincident with the user who is indicated in the identification information,
receive from the user an operation to customize the personal panel setting information,
customize the personal panel setting information included with the print job in accordance with the operation, and
transmit the customized personal panel setting information to the printer driver for storing in a storing memory;
wherein the printer driver obtains from the print device the personal panel setting information of a user having the printer driver and stores the personal panel setting information in a storing memory, and prepares a print job including identification information of the user and the stored personal panel setting information and transmits the print job to the print device for printing.

* * * * *